United States Patent [19]
Houck et al.

[11] Patent Number: 5,920,571
[45] Date of Patent: Jul. 6, 1999

[54] FREQUENCY CHANNEL AND TIME SLOT ASSIGNMENTS IN BROADBAND ACCESS NETWORKS

[75] Inventors: David J. Houck, Colts Neck; Wai Sum Lai, Holmdel, both of N.J.

[73] Assignee: Lucent Technologies Inc., Murray Hill, N.J.

[21] Appl. No.: 08/797,372

[22] Filed: Feb. 7, 1997

[51] Int. Cl.$^6$ .................................................. H04L 12/43
[52] U.S. Cl. .......................................... 370/458; 370/478
[58] Field of Search ..................................... 370/458, 480, 370/478, 485, 486, 487, 489, 490, 499, 494

[56] References Cited

U.S. PATENT DOCUMENTS 5,805,203  9/1998  Horton ....................................... 348/12

*Primary Examiner*—Jeffery A. Hofsass
*Assistant Examiner*—Mitchell Slavitt

[57] ABSTRACT

A system and method are described for assigning downstream and upstream communication pathways in broadband access networks, such as networks based on the hybrid fiber-coax architecture. In the upstream direction, frequency channel and time slot assignments use a packing opposite methodology, which is dependent on the type of service request. The system assigns the lowest time slot in the lowest frequency available for a DS0 service request and the highest time slot in the highest frequency which has the next four contiguous time slots available for an H0 service request. To optimize upstream bandwidth efficiency, a H0 channel occupying the space of four contiguous time slots is used to carry up to six simultaneous voice conversations. A method is described that governs such use of H0 channels by NIUs according to their offered loads. In the downstream direction, network interface units are automatically assigned frequencies in response to the expected load across the available frequency channels and are made to spread evenly the load across all downstream frequency channels. In one embodiment, assignments are based upon each individual network interface unit load, each network interface unit group load, the capacity of each network interface unit group and the blocked load. An assignment will be made to the group having the maximum idle capacity, i.e., the group which has the greatest blocked load differential. That is, assignments are made if moving an individual NIU from a first NIU group to a second NIU group results in a blocked load differential greater than the cost ratio R, where R represents the cost of moving an NIU divided by the cost.

26 Claims, 2 Drawing Sheets

FIG. 2A
| | 1 | | 5 | | 3 | 3 | 3 | 3 | | | | 2 | | | 6 | | | 4 | | |
FIG. 2B
| 1 | 2 | 4 | 5 | 6 | | | | | | | | | | | 3 | 3 | 3 | 3 |
FIG. 2C
| 1 | 2 | 3 | 3 | 3 | 3 | 4 | 5 | 6 | | | | | | | | | | |
FIG. 2D
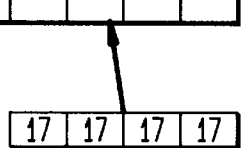
FIG. 2E
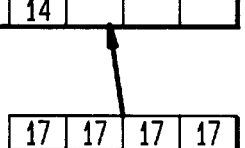

FREQUENCY CHANNEL AND TIME SLOT ASSIGNMENTS IN BROADBAND ACCESS NETWORKS

FIELD OF THE INVENTION

This invention relates to the field of telecommunication systems, and more particularly to broadband access networks.

BACKGROUND OF THE INVENTION

As telecommunications technology progresses, a host of new broadband services can be provided over the public switched telecommunications networks, including broadcast television, cable television, interactive television, orders-on-demand, enhanced pay-per-view, etc. As would be understood, it is desirable that these broadband services along with traditional narrowband telephony services be delivered to the user in an efficient and economically feasible manner. One such network which delivers all of the above broadband and narrowband services uses hybrid fiber-coax technology, which takes advantage of the broadband capabilities of optical fiber and combines it with cost effective coaxial cable technology.

In general, a hybrid fiber-coax ("HFC") system is comprised of a central office/headend ("CO/HE"), a feeder system, a distribution system and a customer interface. The CO/HE establishes signaling and packet paths for all upstream and downstream communications. It is also the origination point for all downstream signals and as such, service provider signals are brought into the CO/HE, processed, combined, and converted to an optical format and sent over the feeder system to an optical node (or fiber node). The optical signal is then converted to an electrical signal in different radio frequencies ("RF") and sent over multiple coaxial cables to a network interface unit ("NIU") present on or near the subscriber's home. The NIU is an intelligent, addressable device which takes the combined RF electrical input and splits off the appropriate telephony and video signals to the home. In the reverse direction, upstream traffic originates from the NIU, where it is sent to the optical node. The optical node converts the signal from electrical to optical format and forwards it over the feeder system to the CO/HE.

HFC systems typically occupy up to the 750 MHz frequency bandwidth, where the available RF spectrum is allocated in accordance with the designated use of the system. A portion of that bandwidth is reserved for circuit-switched applications. The invention deals with the efficient utilization of this capacity.

In general, traffic is comprised of calls, each of which requires some number of time slots to carry a specified type of information (i.e., voice or video signals) over a designated RF channel. Voice information is carried over a Digital Service, level 0 ("DS0") channel, which has a rate of 64 kbps and video information is carried over an H-channel, specifically an H0 channel, which has a rate of 384 kbps. Bi-directional DS0 service requests require a single time slot in the upstream and downstream directions and H0 service requests require four contiguous time slots in the upstream direction and six not necessarily contiguous time slots in the downstream direction. Since different service requests may interfere with each other, assignment of RF resources in the upstream and downstream directions have a significant impact on the resulting blocking probability.

In the upstream direction, calls must first obtain from the CO/HE a time slot on an RF frequency (as designated above) on the coaxial cable using a time division multiple access protocol. This upstream time slot assignment process is complicated by several factors. First, NIU transmitters are agile enough to dynamically change frequencies and so can access several different RF frequencies depending on the CO/HE. This capacity is shared by all the NIUs on the same coaxial cable and allows for significant concentration, which in turn means a possibility for blocking. Concentration is the process by which a potential offered load that exceeds the traffic-carrying capacity of the system is handled and blocking refers to an instance when a call cannot be handled by the network. As it takes time to change frequencies, an NIU transmitter can handle simultaneous calls on different frequencies only in certain non-overlapping time slots in the different accessible frequencies. As such, the assignment of time slots in the upstream direction is a dynamic process depending upon the available resources.

In the downstream direction, a call must also obtain a time slot on an RF frequency. However, in this direction, the NIU receiver is semi-permanently assigned to a particular frequency and thus at call setup time, only time slots within that frequency are available. NIUs that share a downstream frequency but are not necessarily on the same coax, are referred to as an NIU group. Since the assignments of NIU groups are semi-permanently defined, downstream assignments of frequency to an NIU can only be accomplished during idle times, i.e., when there are no calls on the NIU. As a result, downstream frequency assignments are not dynamic and require an evaluation process which considers the load carried by each NIU and each NIU group.

Accordingly, there is a need to provide a method and system which can dynamically assign upstream frequency channels and time slots and can automatically assign downstream frequency channels and time slots in view of the accepted load across all of the downstream frequencies.

SUMMARY OF THE INVENTION

In accordance with the present invention, a system and method is provided which assigns time slots and frequency channels in both the upstream and downstream directions in broadband access networks, especially hybrid fiber-coax systems. In the upstream direction, frequency channel and time slot assignments are dependent upon whether the service call requires a DS0 or an H0 type channel. If the call requires a DS0 channel, then the system assigns the lowest time slot in the lowest frequency available. On the other hand, if the call requires an H0 channel, then the system assigns the highest time slot in the highest frequency which has the next four contiguous time slots available. Thus, upstream frequency channel and time slot assignment is implemented in a packing opposite manner that is dependent on the service required. To optimize upstream bandwidth efficiency, an H0 channel occupying the space of four contiguous time slots is used to carry up to six simultaneous voice conversations. A method is described that governs the said use of H0 channels by NIUs according to their offered loads.

In the downstream direction, NIUs are automatically assigned frequencies in response to the expected load across the available frequency channels. Assignments are made in such a manner that the load from all NIUs is spread evenly among all the NIU groups. In accordance with one embodiment of the present invention, assignments are based upon the load on each individual NIU, the load on each NIU group, the capacity of each NIU group and the blocked load. Dependent upon the above data, a new NIU (if any) will be assigned to the NIU group having the maximum idle capacity, i.e., the group which has the greatest difference between capacity and group load. Downstream frequency assignments are reassigned if moving the individual NIU from a first NIU group to a second NIU group results in a blocked load differential greater than a cost ratio R, where R represents the cost of moving an NIU divided by the cost of blocking.

In another embodiment, initial assignments of the NIUs (when no services are yet assigned to the NIUs) are made so as to distribute the NIUs evenly among the NIU groups. Once services are assigned to an NIU, the NIU will be reassigned to that NIU group which has the lowest relative occupancy following the assignment of the NIU to the NIU group. The relative occupancy is the ratio of the total expected concentrated traffic on a given NIU group to the maximum traffic load with an acceptable value for the probability of blocking, given the number of time slots available for concentrated traffic in the NIU group.

BRIEF DESCRIPTION OF THE DRAWINGS

A more complete understanding of the present invention may be obtained from consideration of the following description in conjunction with the drawings in which:

FIGS. 2(a)–2(e) show an illustrative example of the upstream time slot assignment.

DETAILED DESCRIPTION

Figure 1:
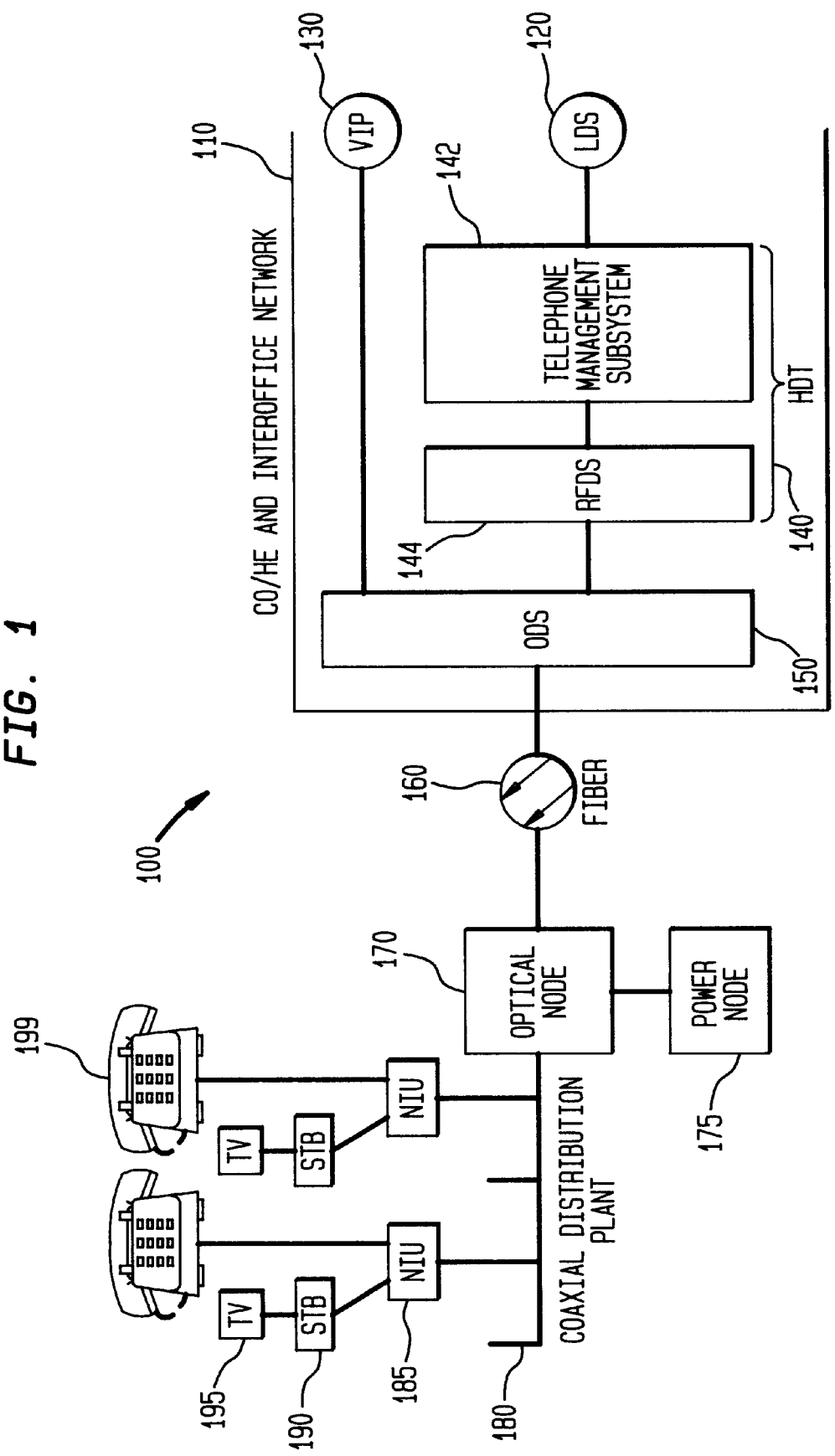
FIG. 1 depicts one illustrative embodiment of a hybrid fiber-coax architecture.

Referring now to FIG. 1, there is shown an illustrative embodiment of a hybrid fiber-coax network architecture, generally designated as network 100. In general, network 100 consists of a central office/headend ("CO/HE") 110 coupled to an optical node (also known as a fiber node) 170 via an optical feeder plant 160. A power node 175 is electrically coupled to optical node 170. Optical node 170 is further coupled to a network interface unit ("NIU") 185 via a coaxial distribution plant 180. As would be understood, an NIU 185 is the device, for example, through which a television 195 (via a set top box 190 (if needed)) and a telephone 199 communicates with the network 100. CO/HE 110 further consists of a host digital terminal ("HDT") 140 coupled to an optical distribution system ("ODS") 150. HDT 140 is itself comprised of a telephone management subsystem 142, which has a TR-303 interface unit, and an RF distribution subsystem ("RFDS") 144.

Functionally, CO/HE 110 is the origination point for all downstream signals onto network 100. These signals enter CO/HE 110 from two sources: telephony through a local digital switch 120, and video information providers ("VIP") 130 through a video headend. Telephone signals are modulated onto RF carriers by RFDS 144 and then fed to ODS 150, which contains the linear lasers used to optically convert and transmit the signals before they are fed over optical feeder plant 160 to optical node 170. Video signals from the video headend (i.e., VIP 130) are fed directly to ODS 150, which in turn again feeds the signal to optical node 170. In the downstream direction, optical node 170 combines the signals, converts them from optical to electrical format and launches them over coaxial distribution plant 180. In the upstream direction, optical node 170 operates in reverse, and if required provides frequency block conversion.

Coaxial distribution plant 180 distributes the signals from optical node 170 to NIUs 185, which are located on or near a subscriber's house. NIUs 185 are intelligent, addressable devices which take the input RF signals and splits them off to the proper receiving devices, for example telephone 199 and television 195 or set top box 190 (which may be needed for some services and certain signals). HDT 140 establishes the signaling and packet paths with NIUs 185 for all upstream and downstream communications. NIUs 185 come in a variety of line sizes and service applications for use in a single home, multiple dwellings and large complexes. An NIU for a single home can have 1 or 2 lines, whereas a multi-living unit can have up to 60 lines.

Communication pathways (i.e., the signaling and packet paths referred to above) have to be established in order to deliver a call between CO/HE 110 and NIU 185. In the upstream direction, NIUs use a Time Division Multiple Access ("TDMA") protocol for upstream transmission. TDMA is used to allocate a discrete amount of frequency bandwidth in the form of time slots to each call, in order to permit many simultaneous conversations. As such, calls in the upstream direction must first obtain a time slot on an RF frequency on the coax cable. The transmitters in the NIUs can use several different RF frequencies, depending upon the HDT 140. Since this capacity is shared by all of the NIUs that are on a specific coax, significant concentration is possible, which in turn means a potential for blocking. In addition, as it takes time for the transmitters to dynamically change frequencies, simultaneous calls on different frequencies can only be handled in non-overlapping time slots in the different frequencies. As a consequence, frequency channel and time slot assignments in the upstream direction are done dynamically on a per call basis to optimize resources.

A frequency channel and time slot assignment methodology is described herein in accordance with the present invention. In general, an assignment is dependent upon whether the type of service requested is a DS0 or H0 service. If a DS0 service is requested (where one time slot is required to transmit one voice conversation and is referred to as a TB1 burst), then the assignment process will select the lowest available frequency channel and the lowest available time slot in the selected frequency channel. In contrast, if a H0 service is required (where four contiguous time slots are needed to carry video information and alternatively, can as a result of saving space on overhead, carry six voice conversations (also referred to as a TB3 burst)), then the assignment process will select the highest available frequency channel and the four highest contiguous time slots available in the selected frequency channel. That is, TB1 and TB3 bursts are allocated or packed starting at opposite ends of the available frequency channels and time slots and are thereafter headed towards each other. The method of the present invention improves the probability of finding the necessary space for the different burst types, and will use the allotted space efficiently.

Referring to FIGS. 2(a)–2(e) and Table 1, a comparison is shown of alternative methods of assigning frequency channels and time slots. In these examples, a mixture of ordinary telephony traffic requiring DS0 service and video telephony requiring H0 service is assumed. Assuming that the system is idle or empty of traffic, FIGS. 2(a)–2(c) illustrate how assignments would be made if using a packing random method, a packing same method or a packing opposite method. If each square represents a specific combination of a frequency channel and time slot, then it is observed that the packing random method in FIG. 2(a) leaves gaps which can only be filled by TB1 bursts and no TB3 bursts. As such, the packing random method is inefficient and results in a waste of resources. As shown by the gaps in FIGS. 2(b) and 2(c), the packing opposite and packing same methods leave squares open which can be assigned with both TB1 and TB3 bursts.

Referring to FIGS. 2(d) and 2(e), we now assume that calls 7–14 arrive, calls 1, 3 and 6 depart and that calls 15 and 16 arrive. Note that in the packing same method, the TB3 burst (call 17) cannot be assigned in the remaining squares and as a result is blocked. However, in the packing opposite method, the TB3 burst is assignable and the call is completed. Although the above is a specific example, different traffic loads have been analyzed in light of the two methods, the comparisons of which indicate that the packing opposite method is more efficient and results in less blocking. Referring to Table 1, a comparison is shown of different traffic loads and the resulting blocking incurred when using the packing opposite and packing same methods.

TABLE 1

Blocking For Two Time Slot Assignment Methods

| Average Load | Packing Same Video Blocking | Packing Same Overall Blocking | Packing Opposite Video Blocking | Packing Opposite Overall Blocking |
|---|---|---|---|---|
| 1000 CCS | .01795 | .00149 | .01083 | .00097 |
| 1110 CCS | .06430 | .00544 | .04494 | .00447 |
| 1225 CCS | .14497 | .01257 | .11295 | .01140 |

In the above example, approximately 10% of the load came from video telephony traffic and there was sufficient downstream capacity so that no blocking occurred in that direction. Traffic load is indicated in units of CCS, which represents one hundred seconds of telephone conversation in a busy hour. Another unit of measurement for traffic load is the erlang, which is equivalent to 36 CCS. As seen in Table 1, packing opposite is clearly the preferable method at all load points. As such, the packing opposite method is more efficient in costs and resources and results in less blocking.

In a further embodiment of the present invention, the upstream assignment method takes into consideration the traffic load offered by an NIU in the optimal use of a TB3 burst to carry up to six simultaneous voice conversations. Since a TB3 burst occupies the space of four contiguous time slots within a given frequency, a higher efficiency can be gained when it carries more than four simultaneous voice conversations most of the time. Based on this consideration, two classes of NIUs are distinguished: high-traffic, which are assigned TB3(s), and low-traffic, which are not assigned TB3s. Furthermore, for a given high-traffic NIU, an upper limit is placed on the number of TB3 bursts that will be assigned simultaneously to it. This is to increase the probability of the efficient use of all the TB3 bursts allocated for this purpose during the busy hour. Such an upper limit is referred to as the TB3 ceiling of an NIU. In the following embodiments, the NIU employs a single transmitter, which can transmit on up to some limit k upstream frequencies simultaneously, provided that the time slots it uses in the different frequencies do not overlap.

In accordance with the above type of NIU, when an NIU which serves k or fewer lines requests a DSO service, the system shall dynamically assign the lowest numbered accessible idle TB1 burst on the lowest numbered frequency channel. The call or service request will be blocked if no accessible burst is available. This is done to pack the bursts used by this type of NIU as closely as possible since the number of frequencies the NIU can access simultaneously is equal to or greater than the maximum possible number of concurrent calls.

In addition, if a low-traffic NIU which serves more than k lines requests a DSO service, the system shall search for an accessible idle TB1 burst on all the available upstream frequencies by descending number of idle TB1 bursts, starting with the frequency with the largest number of such bursts, and assign it dynamically for the service. In case of a tie between two frequencies, the system shall assign the one on which the accessible TB1 burst has a lower number. Again, if no such burst is available, the service will be blocked. This method is used to maximize the number of idle bursts on the same upstream channel for the NIU to use for additional concurrent service requests, since the potential number of such requests exceeds the number of channels the NIU can access concurrently.

In contrast, if a high-traffic NIU requests a DSO service, the system shall then assign the upstream resources based on the following considerations. If the NIU is already using a TB3 burst and there is idle space in the burst, the system shall assign a DSO space in the burst for the service. If such a burst is unavailable and the TB3 ceiling of the NIU has not yet been reached, the system shall assign to the service a TB3 burst starting at the highest accessible idle burst in the upstream channel with the largest number of idle bursts. In the case of tie, the system shall assign the higher numbered channel. If a TB3 burst is unavailable, the system shall assign the service a TB1 burst in accordance with the previously mentioned assignment logic. The call will be blocked if an assignment is not possible.

While upstream access is by time-division multiple access ("TDMA") within each coax, downstream is time-division multiplexed ("TDM") across all coaxes through broadcast. In the downstream direction, calls must obtain a TDM time slot on an RF frequency. However, in downstream communications each NIU receiver is semi-permanently assigned to a particular frequency. This means that at call setup time, only time slots within that frequency are available to the NIU. The NIU must tune in to a single frequency at a time for all of its calls and cannot rearrange dynamically on a per call basis. However, when the NIU is idle (i.e., when there are no calls in progress), it is possible to reassign it to a different frequency. Thus in the downstream direction, frequency assignment is a matter of analyzing the expected load and balancing the same across the downstream frequencies. That is, the problem of optimizing the downstream resource utilization becomes one of balancing the expected overall load across the downstream frequencies.

In accordance with the present invention, a method is presented which automatically assigns frequencies for new NIUs and regularly balances the load across all frequencies by reassignment of frequencies to NIUs. The assignment of an NIU to a downstream frequency is made by the system, specifically the HDT controller 140. As stated previously, the set of NIUs (which can be on different coaxes) assigned to the same frequency are referred to as an NIU group. This assignment is stored in non-volatile memory in the HDT (so that the existing assignments can be reestablished after a system failure), which has physical limits on the number of times that data can be written to it. Thus, the methodology in accordance with the present invention avoids churning, and moves as little traffic as possible in balancing the load. In other words, the methodology balances the concerns of under-reacting (not balancing the load) versus over-reacting (responding to temporary load fluctuations).

Balancing the load across the NIU groups requires information about the load on each NIU, the load on each NIU group and capacity of the downstream channels. As such, the following describes the method used to determine the required information.

In accordance with the present invention, an initial determination is required as to the movability of the NIU. Individual NIUs may have nailups (i.e. non-switchable versus switchable lines) on them, which reduce the capacity of the downstream channel for dynamically assigned traffic from the corresponding NIU group. Thus, moving such an NIU from one NIU group to another can result in a loss of connectivity on the nailup lines. If this is unacceptable for the nailups in question, the NIU needs to be marked as unmovable. Next, in order to make NIU group assignments that balance the load, the load per NIU must first be estimated. By the term load, we mean the dynamically assigned traffic on the NIU excluding the nailups. The following methodology is used to determine the load for each NIU. First, each NIU has a default load based on the numbers and types of the lines (business, residence, etc.) on it. Second, for each hour, the usage (dynamically assigned traffic) on each NIU is recorded and, if necessary, the peak hourly usage for the week is updated. Third, for each week, the previous NIU load estimate is updated using an exponential smoothing parameter $\alpha$. Thus, if the current weekly peak usage is denoted by $a_{peak}$ and the previous load estimate is denoted by $a_{prev}$, then the new load estimate is given by $a_{new} = \alpha a_{peak} + (1-\alpha) a_{prev}$. Initially $a_{prev}$ is set to the default value for the NIU. The value of the smoothing parameter $\alpha$ in the above step is set to weigh the trade-offs described above, i.e., a smaller value of $\alpha$ will change the load estimate more slowly, while a larger value of $\alpha$ will react more quickly to change. Upon initial deployment of a NIU, a value of 0.25 is used. The estimation of each NIU group loading is similarly calculated.

In addition to the NIU loading and the NIU group loading, the capacity must be determined for each downstream frequency channel. This is calculated by first determining the number t of time slots available in each downstream frequency. This is the total number in service minus any assigned to nailed-up services. The capacity C is defined as the maximum load that can be offered by this group while achieving the desired grade of service b (probability of blocking). The maximum load a is such that the Erlang blocking $B(t,a)<b$. The Erlang blocking is:

$$B(t,a) = [a^t/t!]/[\Sigma_{i=0}^{t} a^i/i!]$$

In addition to the probability of blocking, another measure that is used is the blocked load. Blocked load is defined as the number of blocked calls times the average holding time, or the offered load minus the carried load.

In accordance with the above, a new NIU with load estimate $a_{NIU}$ plus $n_{NIU}$ nailed up services on it, is assigned to the group that has the maximum idle capacity. That is, if $C_i$ is the capacity of group i and $L_i$ is the current estimated load on group i, then the new NIU is assigned to the group with the largest value of $C_i-L_i$. A further check requires adding $a_{NIU}$ to $L_i$ and subtracting $n_{NIU}$ from $t_i$, where $t_i$ is the number of time slots available on group i and $n_{NIU}$ is the number of nailups on the NIU. If $L'_i > C'_i$ (i.e., the new load on group i exceeds capacity), then additional load balancing and/or capacity additions will be required.

In accordance with the values calculated above, the system must correct any load imbalances. This is accomplished by identifying a value function for moving an NIU from one group to another based on the difference in total blocked load that results. Thus if we were to move $NIU_k$ with smoothed peak usage $a_k$ and $n_k$ nailups from group r to group s, the difference in blocked load will be $$\Delta B = \{L_r B(t_r, L_r) + L_s B(t_s, L_s)\} - \{(L_r - a_k) B(t_r + n_{k,r}, -a_k) + (L_s + a_k) B(t_s - n_k, L_s + a_k)\} \quad \text{Eq.1}$$

A trade-off is made between the relative cost of moving an NIU, $c_m$, versus the cost of blocking traffic, $c_b$. That is, an evaluation is made as to whether $c_m < C_b * \Delta B$. This determines whether a move is worthwhile. Note that only the cost ratio $R = c_m/c_b$ is needed, such that the move test becomes $R < \Delta B$. If the units of blocking are expressed in erlangs (1 erlang=36 CCS), a reasonable value of the ratio R is 0.01. The following is an implementation (expressed in pseudo-code using C-style programming language) in accordance with the present invention:

```
Repeat until no moves are made
    {Let r(s) denote the NIU group with
     minimum (maximum) idle capacity C_i-L_i
     for each NIU_k in Group r do
         {if(NIU_k is not movable) continue;
         Let a_k denote the smoothed peak usage on NIU_k
            to account for traffic noncoincidence
let a'_k=a_kL_r / Σ_{i∈Group-r}a_j}
Pick the movable NIU in Group r whose adjusted
load a'_k+n_k is closest to half the difference in idle
capacity between the two groups; i.e. closest to
1/2[(C_s-L_s)-(C_r-L_r)]
If ΔB>R
    {Move NIU_k from Group r to Group s.
    L_r ← L_r-a'_k
    L_s ← L_s+a'_k
    t_r ← t_r+n_k
    t_s ← t_s-n_k}
    }
If C_r-L_r<0 issue an alert indicating that load
balancing did not work completely.
```

The NIU selection in the above implementation can be simplified by selecting NIUs in any order, testing the move criteria, and moving the NIU if the criteria was met. However, this can require more moves. Approximations for Erlang B in the above equation for $\Delta B$ could be made via table lookup or via analytic approximations of Erlang B and its derivatives, especially since only the differences in blocking are required. The table look-up method is described in detail below since it is simpler in implementation and requires less processing power. The methodology requires the storage of only three values for each NIU, namely, the current hourly usage, the weekly peak, and the smoothed load estimate. As such, it is a cost effective and efficient method for automatic downstream assignments.

An illustration in accordance with the principles of the present invention are now described with reference being made to Table 2. Two NIU groups are considered, each having 96 downstream time slots (no nailups in this example). The capacity, with a blocking value of 0.005, is 77.24 erlangs. Table 2 gives the blocking probability and blocked load for the variety of loads that will be used in the example.

TABLE 2

Load v. Blocking Probability and Blocked Load

| LOAD | BLOCKING PROBABILITY | BLOCKED LOAD |
|---|---|---|
| 60 | .00000445 | .000267 |
| 62 | .0000140 | .000870 |
| 63 | .0000240 | .001511 |
| 65 | .0000652 | .00424 |
| 70 | .0005407 | .03785 |
| 70.111111 | .0005635 | .03951 |
| 72 | .0010955 | .07888 |
| 72.111111 | .0011367 | .08198 |
| 73 | .0015168 | .11073 |
| 73.111111 | .0015710 | .11486 |
| 74 | .0020638 | .15272 |
| 74.888888 | .0026752 | .20034 |
| 75 | .0027609 | .20707 |
| 75.111111 | .0028487 | .21397 |
| 76.888888 | .0045783 | .35202 |
| 77 | .0047084 | .36255 |
| 77.888888 | .0058534 | .45591 |
| 78 | .0060100 | .46878 |
| 79.888888 | .0091687 | .73248 |
| 80 | .0093853 | .75082 |

Consider a large NIU with 5 erlangs of load on a group r. If group r had 80 erlangs and a group s had 60 erlangs, then moving the NIU from group r will reduce its blocked load by 0.75082−0.20707=0.54375, while adding it to group s will increase its blocked load by only 0.00424−0.000267=0.00397. Thus the net decrease in blocked load is 0.54375−0.00397=0.53978. Since this is greater than R=0.01, the move is clearly beneficial. Now suppose that group r only had 65 erlangs. In this case the differences in blocked load are in the third decimal place and the move criteria will be <R. Thus the move will not be beneficial. If group r now had 70 erlangs, the move criteria evaluates to 0.03727 and the move will be made.

Assume now that a small NIU is on group r with 4 CCS or 0.111111 erlangs of load. If group r has 80 erlangs and group s has 70 erlangs then the move criteria evaluates to 0.0167 and the move will proceed. Consider two more examples. In the first, let the load on groups r and s be 78 and 72 erlangs, respectively. Here the move criteria evaluates to 0.01468. If the load on groups r and s were 75.111111 and 74.88888 erlangs, respectively, then the move criteria evaluates to 0.00017 and the move again is not beneficial. In the above examples, the threshold point between a beneficial and non-beneficial move evaluates to be about 77 and 73 erlangs.

As stated previously, a table look-up method can be implemented for the Erlang B calculation in the move criteria evaluation. With 96 time slots, a table can be created which is similar to the above, for many load points where blocking is non-negligible. To be consistent with the data collected in the system, units are expressed in terms of CCS. The following table, in increments of 3 CCS, expresses the blocked load unit of CCS*100(or CS=call seconds). If there were 96 time slots available, then choosing the entry closest to the load will be accurate enough. (For example, it load =2381 use the 2382 entry). If the load is below 2375, use 0 CS and if the load is above 3061, use 7048 CS+(the excess load)*32. To convert R from erlangs to CSs, use a value of 40 CS.

TABLE 3

Load v. Blocked Load

| LOAD (CCS) | BLOCKED LOAD (CS) |
|---|---|
| 2376 | 25 |
| 2379 | 26 |
| 2382 | 27 |
| 2385 | 28 |
| 2388 | 29 |
| 2391 | 30 |
| ... | ... |
| 3057 | 6952 |
| 3060 | 7048 |

For NIU groups with fewer than 96 time slots, some additional approximation is required. The basic process is to inflate the load up to an equivalent 96-time-slot load, look up the blocking in the table, and then deflate it back down to the original size. Consider the following example. Suppose that there were 10 nailed up services on an NIU group and only 96−10=86 time slots available for dynamically assigned traffic. From the capacity table for 0.005 blocking, the capacity of an 86 time slot group is 68.11 erlangs. (Compared with the capacity of 77.24 erlangs for 96 time slots.) An equivalent 96-time-slot load is estimated by multiplying the load by the capacity ratio 77.24/68.11. These ratios can be stored in a separate table to avoid the repetitive division. The above blocking table can then be used to estimate the equivalent blocked load, which is then divided by the capacity ratio to convert the blocked load into 86-time-slot units. For example, if the load on the 86-time-slot group was 2160 CCS (60 erlangs), the load would be adjusted by the capacity ratio, yielding 2450 CCS. Looking up this value in the above table, results in a blocked load of 63 CS. This is then divided by the capacity ratio to get a blocked load of 56 CS. This compares with the exact value of 65 CS. Since only the differences in blocking between two similar load points (with and without moving the NIU in question) is required for the method, the value does not have to be extremely precise. Considering the same example some more, if an NIU with 180 CCS (5 erlangs) of load was on a 96-time- slot group with a total load of 2880 CCS (80 erlangs) and it was moved to a 86-time- slot group with 2160 CCS (60 erlangs), the decrease in blocked load on the large group would be 1958 CS. The increase in blocked load on the smaller group would be 448−56=392 CS. This compares to the actual values of 466−65=401 CS.

In another embodiment of the assignment methodology, the system can use the relative occupancies to balance the load among the NIU groups. Relative occupancy is the ratio of the total expected concentrated traffic on a given NIU group to the maximum traffic load with an acceptable probability of blocking, given the number of available time slots for the concentrated traffic in the NIU group. This measure will be used in reassigning an NIU to an NIU group so as to spread the concentrated traffic load evenly among the available downstream paths.

Initially, the system will assign a newly-installed NIU to an NIU group by using the maximum number of lines that can be served by the NIU, to try to spread the numbers of such lines evenly among all existing NIU groups. The system will then reassign an NIU with newly-assigned services to that NIU group which has the lowest relative occupancy when the NIU is assigned to it. That is, the system will consider the relative occupancies including that of the new NIU in determining group assignment. This will result in even distribution of concentrated traffic among the downstream frequencies in the sense that each frequency channel will provide comparable probabilities of blocking.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for assigning upstream and downstream communications in a broadband access network having at least one network interface unit and a host digital terminal, said method comprising the steps of:

allocating upstream communication pathways in a packing opposite manner responsive to a type of service request; and assigning downstream communication pathways in response to an expected load across all downstream frequencies.

2. The method according to claim 1, wherein said step of allocating includes the step of packing at a first end in response to a first type of said service request and at a second end in response to a second type of said service request.

3. The method according to claim 2, wherein:
   said first type of said service request is one which requires a digital service, level 0 channel; and,
   said second type of said service request is one which requires an H0 channel.

4. The method according to claim 3, wherein:
   said first end is a lowest time slot available in a lowest frequency channel available; and
   said second end is a highest time slot available in a highest frequency channel available.

5. The method according to claim 4, wherein said highest frequency channel available requires four contiguous time slots.

6. The method according to claim 1, wherein when said network interface unit serves less than a given number of lines and a digital service, level 0 (DS0) service is required, said step of allocating selects the lowest accessible idle DS0 burst on the lowest available frequency channel.

7. The method according to claim 1, wherein when said network interface unit serves more than a given number of lines and a DS0 service is required, said step of allocating includes the step of searching for an accessible idle DS0 burst on all available said upstream communication pathways by descending number of idle bursts, said searching step starting at said pathway with a largest number of said idle bursts.

8. The method according to claim 1, wherein when said network interface unit is a high traffic network interface unit and a DS0 service is required, said step of allocating includes the steps of:

determining if said high traffic network interface unit has previously allocated a H0 channel and evaluating whether said H0 channel has idle space for said DS0 service;

assigning said idle space if available to said DS0 service;

designating a new H0 channel starting at a highest numbered accessible idle burst if said idle space is not available; and, allotting a DS0 burst if space is not available for designating said new H0 channel.

9. The method according to claim 1, wherein said step of assigning includes the steps of:
   calculating a blocked load differential; and
   moving said network interface unit from a first downstream frequency channel to a second downstream frequency channel when said blocked load differential is greater than a given threshold.

10. The method according to claim 9, wherein said step of calculating said blocked load differential includes the steps of:

estimating a load for each said network interface unit and at least one network interface unit group, wherein said network interface unit group includes each said network interface unit assigned to a specific downstream frequency channel;

determining a capacity of all downstream frequency channels; and computing a blocked load for each said group by subtracting the carried load from the offered load.

11. The method according to claim 9, wherein said given threshold is the ratio of the cost of moving versus the cost of blocking traffic.

12. The method according to claim 1, wherein said step of assigning includes the steps of:

delegating said network interface unit to one of at least one network interface unit groups such that a plurality of telecommunication lines is spread evenly among all said groups, wherein each of said groups corresponds to a specific downstream frequency channel; and, reassigning said network interface unit to that one of said groups having a lowest relative occupancy when such said network interface unit is assigned to said that one of said groups.

13. The method according to claim 12, wherein said relative occupancy is the ratio of the total expected concentrated traffic on a given group to the maximum traffic load with an acceptable probability of blocking, given a number of available time slots for traffic in said given group.

14. A system for assigning upstream and downstream communications in a broadband access network, said system comprising:

at least one network interface unit;

a controller coupled to said at least one network interface unit; said controller operable to allocate upstream communication pathways in a packing opposite manner responsive to a type of service request; and said controller operable to assign downstream communication pathways in response to an expected load across all downstream frequencies.

15. The system according to claim 14, wherein said controller packs a first end in response to a first type of said service request and at a second end in response to a second type of said service request.

16. The system according to claim 15, wherein: said first type of said service request is one which requires a digital service, level 0 channel; and,
    said second type of said service request is one which requires a H0 channel.

17. The system according to claim 16, wherein: said first end is a lowest time slot available in a lowest frequency channel available; and
    said second end is a highest time slot available in a highest frequency channel available.

18. The system according to claim 17, wherein said highest frequency channel available requires four contiguous time slots.

19. The system according to claim 14, wherein said controller further includes:
   means for calculating a blocked load differential; and
   means for moving said network interface unit from a first downstream frequency channel to a second downstream frequency channel when said blocked load differential is greater than a given threshold.

20. The system according to claim 19, wherein said controller further includes:
   means for estimating a load for each said network interface unit and at least one network interface unit group, wherein said network interface unit group includes each said network interface unit assigned to a specific downstream frequency channel;
   means for determining a capacity of all downstream frequency channels; and
   means for computing a blocked load for each said group by subtracting the carried load from the offered load.

21. The system according to claim 20, wherein said controller further includes:
   means for delegating said network interface unit to one of at least one network interface unit groups such that a plurality of lines is spread evenly among all said groups, wherein each of said groups corresponds to a specific downstream frequency channel; and,
   means for reassigning said network interface unit to that one of said groups having a lowest relative occupancy when such said network interface unit is assigned to said that one of said groups.

22. An apparatus for assigning upstream and downstream communications in a hybrid fiber-coax network, said apparatus comprising:
   at least one network interface unit;
   a controller operable to allocate upstream communication pathways with said network interface unit in a packing opposite manner responsive to a type of service request; and
   said controller operable to assign downstream communication pathways with said network interface unit in response to an expected load across all downstream frequencies.

23. The apparatus according to claim 22, further comprising means for packing a first end in response to a service request requiring a digital service, level 0 channel and a second end in response to a service request requiring a H0 channel, wherein said first end is a lowest time slot available in a lowest frequency channel available, and said second end is a highest time slot available in a highest frequency channel available.

24. The apparatus according to claim 22, wherein said controller further includes:
   means for calculating a blocked load differential; and
   means for moving said network interface unit from a first downstream frequency channel to a second downstream frequency channel when said blocked load differential is greater than a given threshold.

25. The apparatus according to claim 24, wherein said means for calculating further includes:
   means for estimating a load for each said network interface unit and at least one network interface unit group, wherein said network interface unit group includes each said network interface unit assigned to a specific downstream frequency channel;
   means for determining a capacity of all downstream frequency channels; and
   means for computing a blocked load for each said group by subtracting the carried load from the offered load.

26. The apparatus according to claim 22, further comprising:
   means for delegating said network interface unit to one of at least one network interface unit groups such that a plurality of lines is spread evenly among all said groups, wherein each of said groups corresponds to a specific downstream frequency channel; and,
   means for reassigning said network interface unit to that one of said groups having a lowest relative occupancy when such said network interface unit is assigned to said that one of said groups.

* * * * *